United States Patent [19]
Yoshida

[11] Patent Number: 4,781,644
[45] Date of Patent: Nov. 1, 1988

[54] ASSEMBLY KIT FOR TOY OR THE LIKE

[75] Inventor: Takaharu Yoshida, Hyogo, Japan

[73] Assignee: Abero Laboratory Inc., Osaka, Japan

[21] Appl. No.: 898,586

[22] Filed: Aug. 21, 1986

[30] Foreign Application Priority Data

Oct. 12, 1985 [JP] Japan .................................. 60-227504

[51] Int. Cl.⁴ .......................... A63H 33/12; F16B 7/00
[52] U.S. Cl. ...................................... 446/123; 446/126;
403/171; 211/182; 211/186; 211/189; 52/731
[58] Field of Search ............... 446/126, 107, 108, 122,
446/123, 124, 85; 403/171, 176, 172, 170, 178,
173, 174, 175, 177; 211/189, 182, 186, 191, 192;
D21/108; 52/648, 731; 297/440

[56] References Cited

U.S. PATENT DOCUMENTS 4,129,975  12/1978  Gabriel ........................ 446/126 X
4,313,687   2/1982  Apeztegui et al. ............. 402/171
4,626,123  12/1986  Brown ......................... 403/171 X

FOREIGN PATENT DOCUMENTS 55-14396  1/1980  Japan .
715735   12/1980  U.S.S.R. ........................ 403/171

Primary Examiner—Mickey Yu
Attorney, Agent, or Firm—Wenderoth, Lind & Ponack

[57] ABSTRACT

An assembly kit for use as a toy or the like including plurality of rod elements, each having a pair of half portions and fasteners for fixing together the half portions, the half portions having ends in the axial direction and first and second recessed portions on the ends respectively. The first recessed portions are formed in a semi-arcuate configuration, and the second recessed portions are smaller in diameter than the first recessed portions and extend axially outward from the first recessed portions. A plurality of bolts are provided having head portions and shank portions connected to the head portions, the head portions being formed in a disk shape to respectively fit into the first recessed portions and the shank portions being respectively provided with external threads at a front end of the shank portion to fit in the second recessed portion. A plurality of connecting elements forming spheres in general are provided with a plurality of internal threads with which the bolts are engaged.

20 Claims, 16 Drawing Sheets

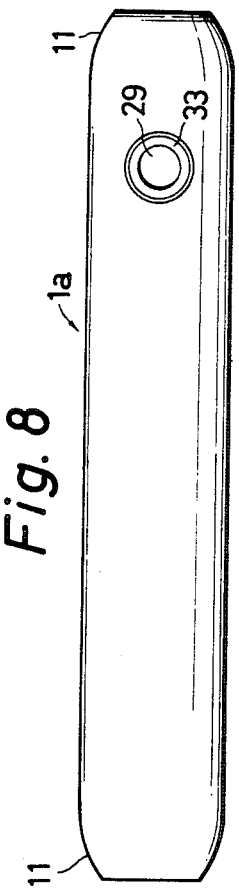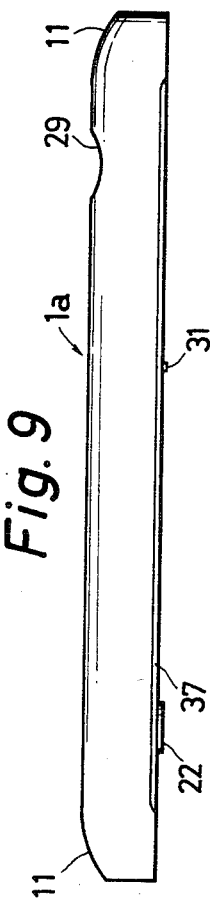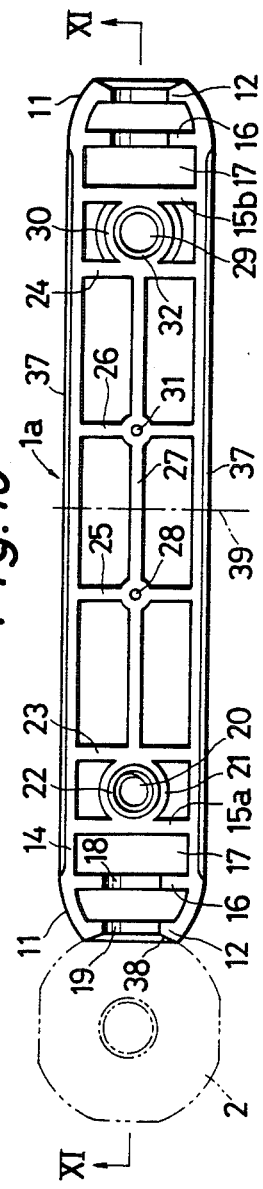

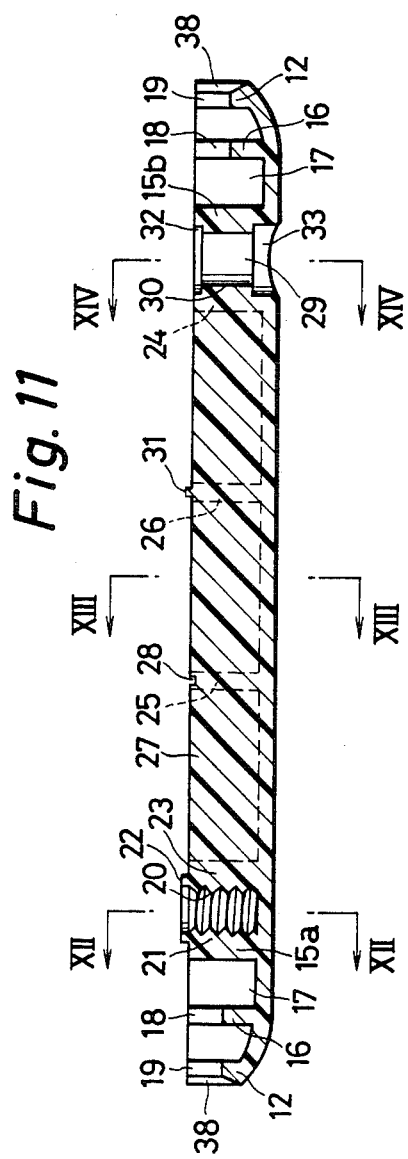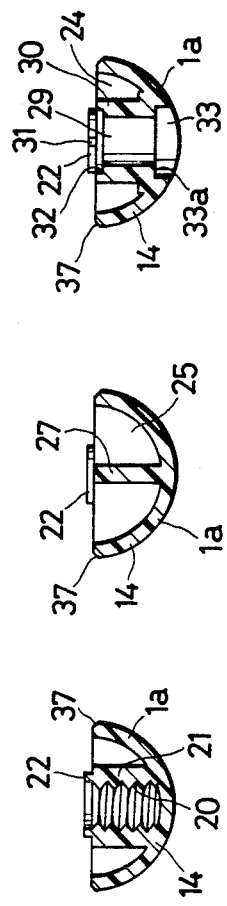

ASSEMBLY KIT FOR TOY OR THE LIKE

BACKGROUND OF THE INVENTION

1. Field of the Invention

This invention relates to an assembly kit for constructing a framework or the like and, more particularly, to an assembly kit suitable for use as a toy.

2. Related Art Statement

A typical related art disclosure of the sort is found in Japanese publication of unexamined patent application No. 55-14396. Such assembly kit includes a plurality of hollow tubes having a linear axis, and joints having juncture portions into which the tubes are fitted at their ends for connection aand which are spatially provided in L-shape, T-shape, and tridimensional patterns.

With such a related art assembly kit, one difficulty is that there must be joints having types of different structural configurations in order to meet the needs for changes in assembly configuration, which naturally means a larger number of parts required. Assembly kits of this type are often used as toys for younger children in common households, in which case comparatively frequent changes are required in assembly configuration. Indeed, the procurement of different types of joints for such a purpose requires considerable costs to be borne by the toy users.

Another difficulty with the related art is that when assembling a cube, for example, by using tubes and joints, or disassembling the cube, fitting the ends of one tube into juncture portions of some joints or pulling the tube ends out from the juncture portions may exert some unreasonable force on the other tubes and joints, thus causing some strain to them. Furthermore, such assembling and disassembling requires the use of considerable force and involves some handling difficulty to those who are not experienced in such work.

A further difficulty with the related art assembly kit is that the tube and joint elements of the kit are comparatively complicated in configuration because they are to be fixedly connected together, with the tubes fitted at their ends into corresponding juncture portions of the joints, a feature which results in complicated assembling and disassembling work and poor productivity.

SUMMARY OF THE INVENTION

In order to overcome the aforesaid difficulties, therefore, it is an object of the invention to provide a novel and improved assembly kit for toy use.

It is another object of the invention to provide an assembly kit for toy use which has a reduced number of parts and which is easy to assemble and disassemble, with not much labor required in such work.

In accomplishing the above objects, an assembly kit for toy use or the like according to an aspect of the invention comprises a plurality of rod elements, each formed by a pair of half portions and fasteners for fixing together the half portions, the half portions having ends in the axial direction and first and second recessed portions on the ends respectively, the first recessed portions being formed in semi-arcuate configuration, and the second recessed portions being smaller in radius than the first recessed portions and extending axially outward from the first recessed portions, a plurality of bolts having head portions and shank portions connected to the head portions, the head portions being formed in a disk shape to respectively fit into the first recessed portions and the shank portions being respectively provided with external threads at a front end of the shank portion to fit in the second recessed portion, and a plurality of connecting elements forming spheres in general being provided with a plurality of holes having internal threads with which the bolts are engaged.

In a preferred embodiment, the pair of half portions are formed respectively with an identical configuration.

In another preferred embodiment, a total of six holes having internal threads are formed in the connecting elements, having axes on three straight lines which are perpendicular to one another.

According to this invention, as assembly kit comprises half-parted rod elements, bolts, and spherical connecting elements; therefore, it is unnecessary to provide a large variety of parts, a feature which allows a simplified construction and improved productivity. Especially where the assembly kit is a toy, this also means reduced cost to general household users and it is thus expected that the invention will be widely accepted in the market place.

Each rod element formed from one pair of identical half portions joined by fasteners; therefore, when assembling the assembly kit into a cube, for example, or disassembling such cube, each rod element is separated into two half portions by loosening the fasteners, so that connecting and disconnecting may be easily carried out through the fasteners or bolts by which the rod element is in screw engagement with one or more of the connecting elements. Therefore, not much laborious force is required when constructing a cube or the like, it being thus easy to perform assembling and disassembling work. As such, the assembly kit in accordance with the invention permits unskilled persons to perform such assembling and disassembling work without difficulty.

According to the invention, a disc-shaped head of a bolt fits in a first recessed portion of a semi-arcuate configuration formed in each half portion of each rod element and a shank portion of the bolt fits in a second recessed portion which is smaller in diameter than the first recessed portion, so that the bolt head is securely held in the rod element. Thus, connecting the rod element to another rod element may be easily performed through a connecting element. This, coupled with the fact that the assembly kit is simple in construction as a whole, leads to improved productivity.

BRIEF DESCRIPTION OF THE DRAWINGS

These and other objects, features and advantages of the invention will become more apparent from the following detailed specification and drawings, in which:

FIG. 8 is a plan view showing a half portion;

FIG. 9 is a side view of the half portion;

FIG. 10 is a bottom view of the half portion;

FIG. 11 is a section taken along the line XI—XI in FIG. 10;

FIG. 12 is a section taken along the line XII—XII in FIG. 11;

FIG. 13 is a section taken along the line XIII—XIII in FIG. 11;

FIG. 14 is a section taken along the line XIV—XIV in FIG. 11;

DETAILED DESCRIPTION OF THE PREFERRED EMBODIMENTS

Figure 1:
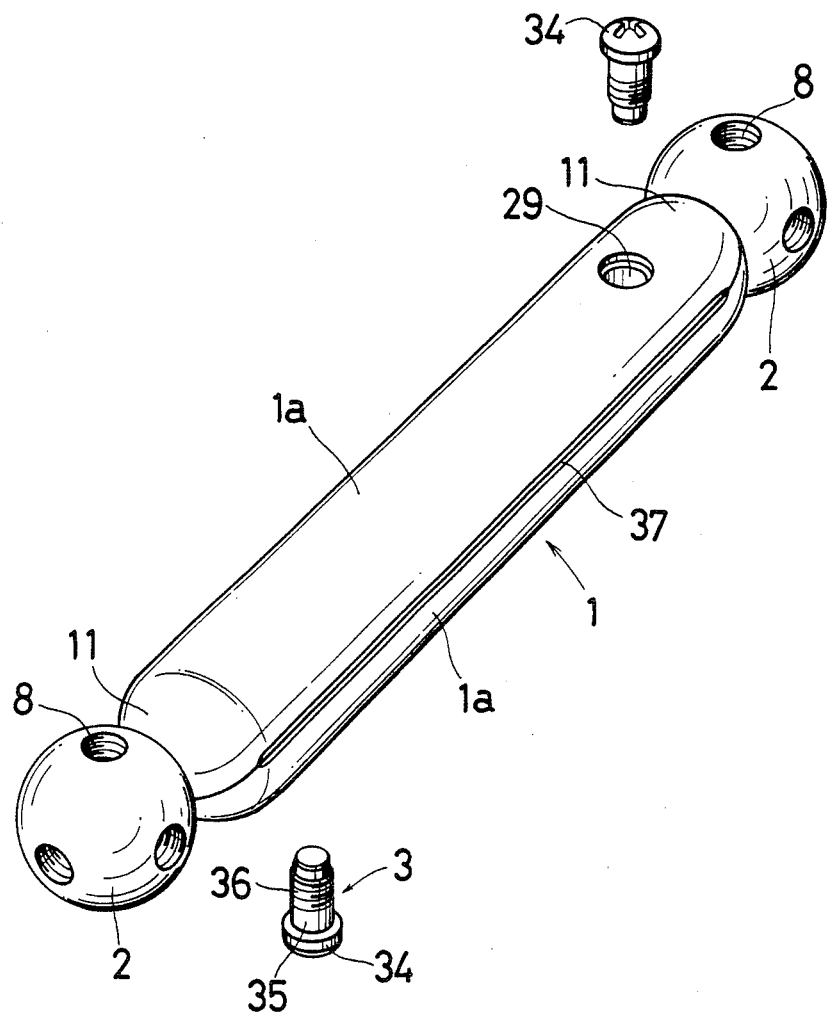
FIG. 1 is a perspective view showing one embodiment of the invention.

Referring now to the drawings, preferred embodiments of the invention are described below.

FIG. 1 is a perspective view showing one embodiment of the invention. A generally spherical connecting element 2 is mounted to each axial end of a rod element 1. Another rod element 1 is connected to the rod element 1 through the connecting elements 2. A toy assembly or the like is constructed in this way.

Figure 2:
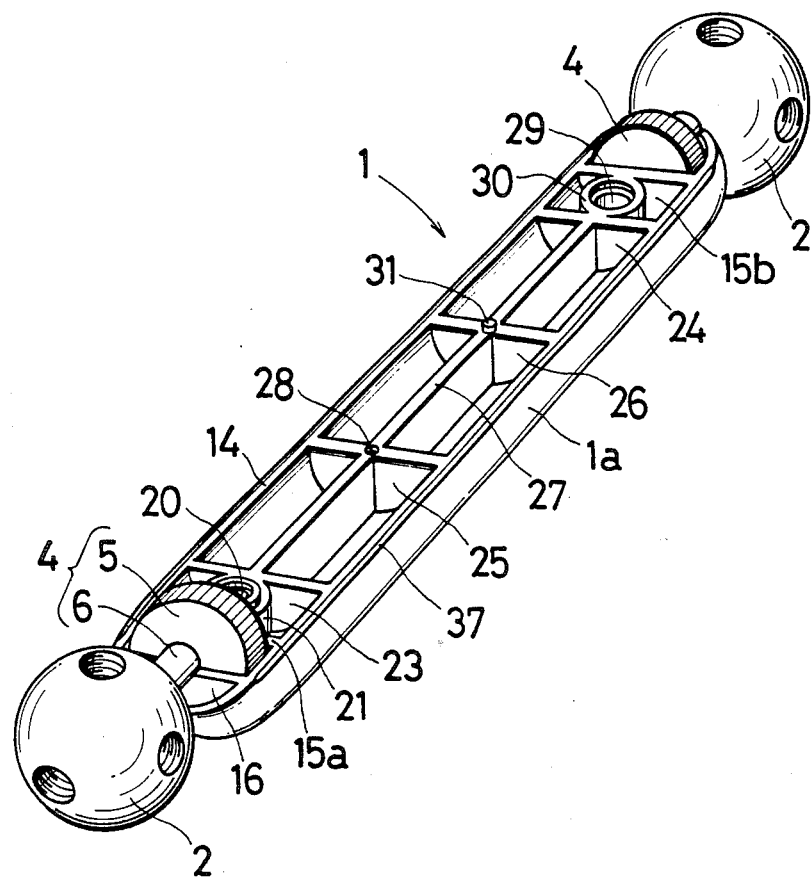
FIG. 2 is an exploded view in perspective showing one rod element.

FIG. 2 is an exploded view in perspective showing one rod element 1. The rod element 1 consists of a pair of half portions 1a of identical construction coupled together in face to face relation. These half portions 1a are fixed together by bolts 3 as a fastener (see FIG. 1).

Figure 3:
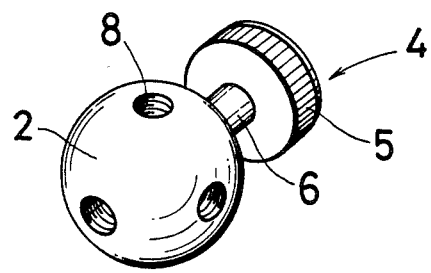
FIG. 3 is a perspective view showing a bolt threadedly engaged with a connecting element.
Figure 4:
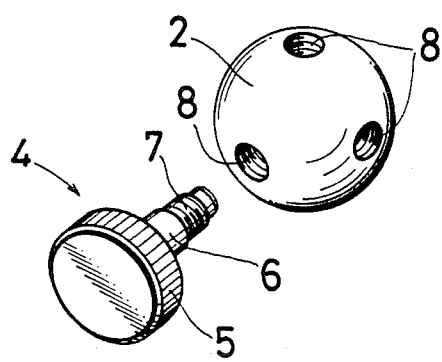
FIG. 4 is a perspective view showing the connecting element and the bolt when separated from each other.

FIG. 3 is a perspective view showing a connecting element 2 and a bolt 4 threadedly engaged therewith. FIG. 4 is a perspective view showing the connecting element 2 and the bolt 4 as they appear when separated from each other. The bolt 4 has a disk-shaped head 5 and a shank 6 fixed at its base to the head 5. The shank 6 is provided with an external thread 7 at its front end. The connecting element 2 has a plurality of holes provided with internal threads 8 formed therein. One of the internal threads 8 is engaged by the external thread 7.

Figure 5:
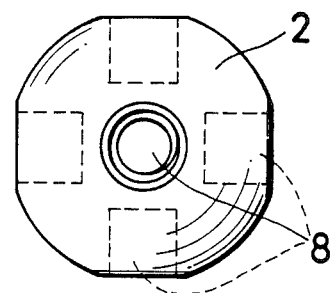
FIG. 5 is a front view of the connecting element.

FIG. 5 is a front view of the connecting element 2. A total of six internal threads are formed in the connecting element 2, and the axes of these internal threads 8 are either parallel or perpendicular to one another.

Figure 6:
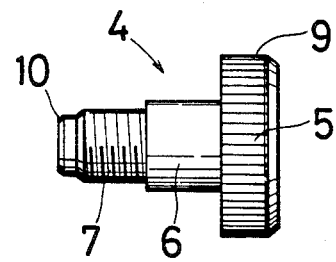
FIG. 6 is a side view of the bolt.
Figure 7:
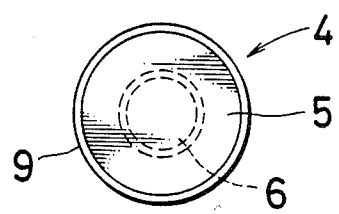
FIG. 7 is a plan view of the bolt.

FIG. 6 is a side view of the bolt 4 and FIG. 7 is a plan view thereof. On the outer periphery of the head 5 there is formed a series of knurls 9 extending along the axis thereof, which facilitates manual rotation. An outer peripheral edge 10 of the external thread 7 formed on the front free end portion of the shank 6 is beveled or tapered and truncated-cone shaped, which prevents possible injury during the handling of the kit and facilitates screwing the external screw 7 into one of the internal threads 8.

FIG. 8 is a plan view showing a half portion 1a of a rod element 1, FIG. 9 is a side view of the half portion 1a, FIG. 10 is a bottom view thereof and FIG. 11 is a section taken along the line XI—XI in FIG. 10. Referring to these views, the half portion 1a has an outer periphery which is semi-cylindrical in configuration, and both ends thereof in the longitudinal direction taper inwardly to form curved portions 11. A first recessed portion 17 is defined at one end of the half portion 1a between a peripheral wall 14, an axially inwardly located wall 15a and an axially outwardly located wall 16, of the half portion 1a. Likewise, at the other end of the half portion 1a, another first recessed portion 17 is defined between the peripheral wall 14, an axially inwardly located wall 15b and an axially outwardly located wall 16. The first recessed portions 17 are coaxial with the rod element 1, and have a semi-cylindrical configuration the radius thereof being uniform in the axial direction. Second recessed portions 18, 19, each having a smaller radius than the first recessed portions 17, are respectively formed in the wall 16 and an end wall 12 at each end of the half portion 1a. The head 5 of the bolt 4 fits snugly in the first recessed portion 17. With the head 5 so held in position, the shank 6 of the bolt 4 fits in and extends through the second recessed portions 18, 19. The axes of the second recessed portions are coincident with the axis of the rod element 1.

A radially extending barrel portion 21 having an internal thread 20 formed therein is provided axially inwardly of one wall 15a of the half portion 1a. An upwardly protruding annular ledge 22 is formed on the end of the barrel portion 21 extending outwardly from a planar surface of the half portion which abuts a planar surface of another one of the half portions which together comprise the rod element 1. Radially extending, spaced apart walls 23, 24, 25, 26 and an axially extending wall 27 are formed in the half portion 1a. A positioning recess 28 is formed at the top of an intersection between the walls 25 and 27. A radially extending barrel portion 30 defining a through hole 29 is provided axially inwardly of the other wall 15b of the half portion 1a. At the top of an intersection between the walls 26 and 27 there is formed a positioning protrusion 31. A notch 32 corresponding to the annular ledge 22 is formed on the end of the barrel portion 30 defining the through-hole 29. The protrusion 31 corresponds to the recess 28.

FIG. 12 is a section taken along the line XII—XII in FIG. 11. The spiral ridges of the internal thread 20 formed in the barrel 21 has a comparatively large width in the axial direction of the thread 20 (in the vertical direction in FIG. 12), a feature which contributes toward improved strength and reduced number of turns required in screwing the bolt 3 and facilitates assembling and disassembling.

FIG. 13 is a section taken along the line XIII—XIII in FIG. 11. The walls 25, 27 extend to the peripheral wall 14, which fact contributes toward increased strength of the half portion 1a, and accordingly of the rod element 1.

FIG. 14 is a section taken along the line XIV—XIV in FIG. 11. A recess 33 is formed in a connecting zone between the barrel portion 30 and the peripheral wall 14.

The head 34 of the bolt 3 shown in FIG. 1 fits into the recess 33. The external thread 36 formed on the shank 35 of the bolt 3 engages the internal thread 20 of the other half portion 1a.

Figure 15:
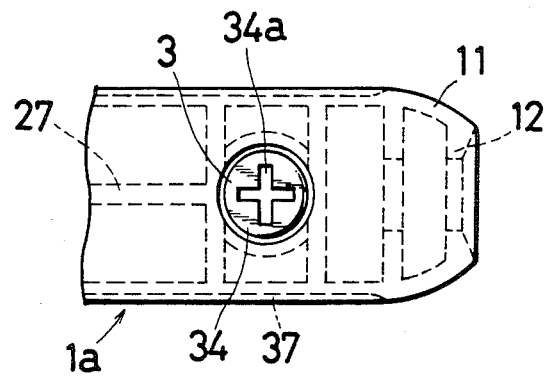
FIG. 15 is a plan view showing half portions coupled together by the bolt.
Figure 16:
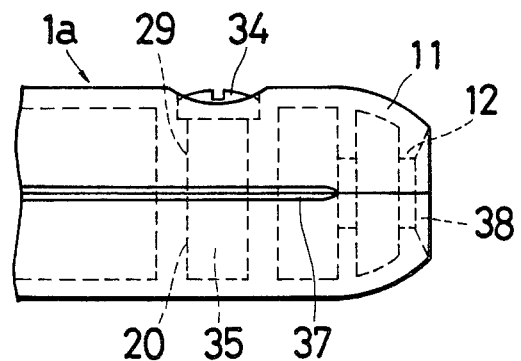
FIG. 16 is a side view of the construction shown in FIG. 15.
Figure 17:
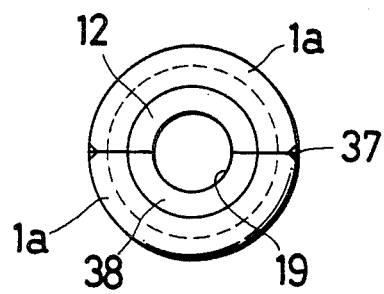
FIG. 17 is a side view showing the coupled configuration in FIGS. 15 and 16.

FIG. 15 is a plan view showing a pair of half portions 1a coupled together by bolts 3. FIG. 16 is a side view thereof. FIG. 17 is a right end view in side elevation showing the coupled configuration in FIGS. 15 and 16. The external thread 36 formed on the shank 35 of the bolt 3 extends through the through-hole 29 of one half portion 1a and engages the internal thread 20 of the other half portion 1a. With the shank 35 held in that position, the head 34 of the bolt 3 does not protrude radially outwardly of the outer periphery of the half portion 1a. The head 34 of the bolt 3 seats on the bottom 33a of the recess 33. A cross-shaped arcuate depression 34a is formed on the bolt head 34. Therefore, the bolt 3 can be tightened or unscrewed with a coin.

A slight notch 37 is formed on both longitudinal side edges of the half portion 1a. The presence of such notch 37 prevents possible injury during manual handling of the half portions 1a. No notch 37 is present on the curved portion 11 at either end of the half portion 1a.

The axial peripheral surface of the end wall 12 of the half portion 1a forms an arcuate surface 38 which extends along the outer periphery of the connecting element 2. Thus, the arcuate surface 38 may be brought into close surface contact with the outer periphery of the connecting element 2, which fact ensures firm connection between the rod element 1 and the connecting element 2 and prevents a loose connection.

As shown in FIG. 10, each half portion 1a is configured generally symmetrically relative to a symmetrical plane perpendicular to its axis at a medium location thereof, and the internal thread 20 and the through-hole 29 are equidistant from the symmetrical plane 39, the recess 28 and protrusion 31 being also equidistant from the symmetrical plane 39. In this way, each rod element 1 is comprised of a pair of half portions 1a having an identical configuration, which provides a simplified construction and a reduced number of parts. Furthermore, this means that only one type of mold is required in the fabrication of such rod element, which in turn results in improved productivity.

Figure 18:
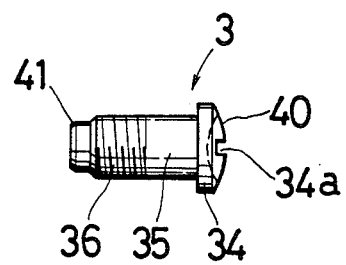
FIG. 18 is a side view showing a bolt.
Figure 19:
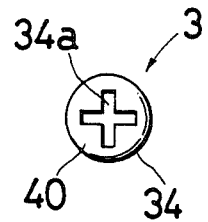
FIG. 19 is a front view of the bolt.

FIG. 18 is a side view showing a bolt 3. FIG. 19 is a front view of the bolt 3. The outer periphery 40 of the head 34 of the bolt 3 is spherical. The outer peripheral edge 41 of the front end of the external thread 36 is chamfered or of a tapered truncated cone shape, a feature which ensures easy engagement of the external thread 36 with the internal thread 20 and eliminates the possibility of any personal injury being caused during the handling of the kit, thus assuring handling safety.

When the rod element 1, in its assembled condition, is seen from above, the head 34 of another bolt 3 is out of sight, a feature which adds to the beauty of the kit. With the bolt 4 and the connecting element 2 fixed together, the bolt 4 and the rod element 1 are angularly displaceable about their axes and relative to each other. Therefore, with the rod element 1 and the connecting element 2 coupled together through the bolt 4, it is possible to assemble and disassemble the rod element 1 with the bolts 3, a feature which assures improved assembly work.

Figure 20:
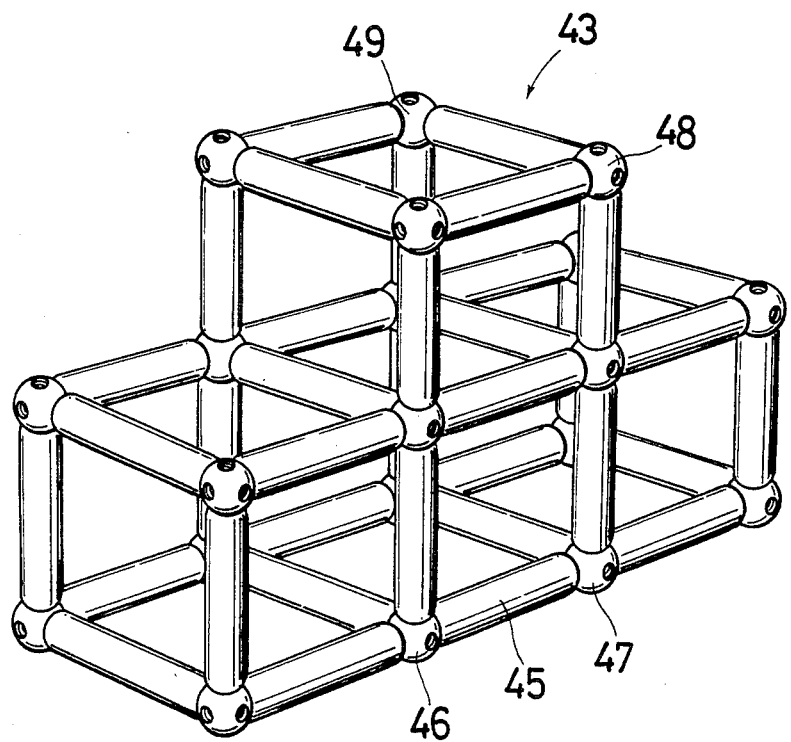
FIG. 20 is a perspective view showing an assembly according to the invention.
Figure 21:
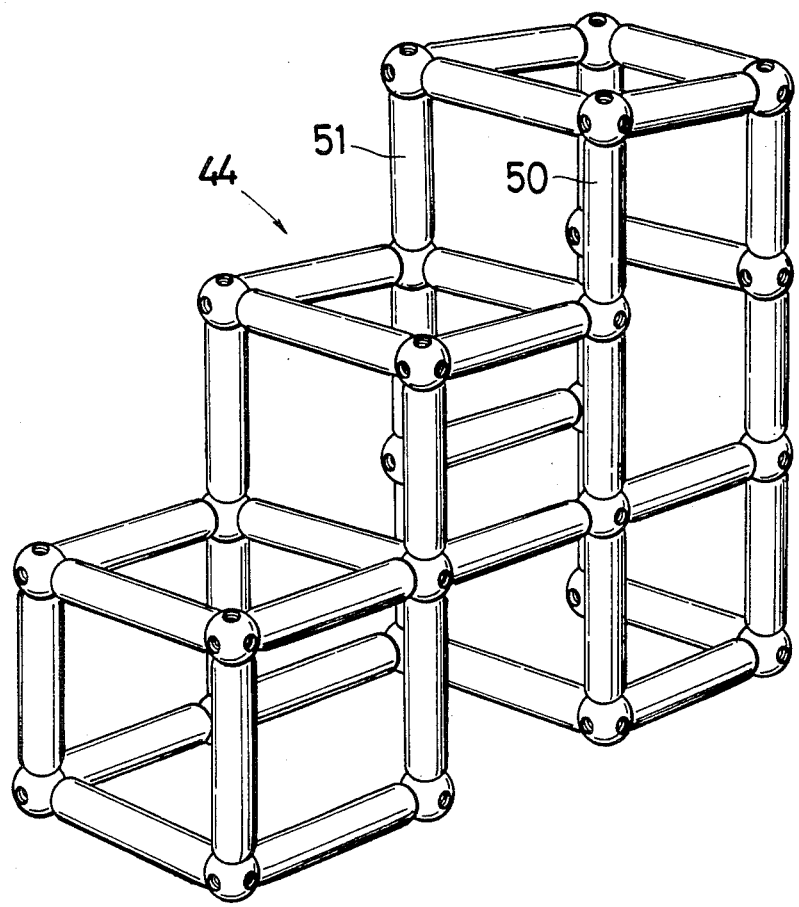
FIG. 21 is a perspective view showing another form of an assembly according to the invention.

FIG. 20 is a perspective view showing an assembly 43 constructed by connecting a plurality of the rod elements 1, bolts 3, 4, and connecting elements 2 as shown in FIGS. 1 to 19. After such an assembly 43 is constructed, it is very easy to construct an assembly 44 shown in FIG. 21, according to the invention. In this case, it is possible to remove a rod element 45 of the assembly 43 in FIG. 20 by disassembling it into a pair of half portions by removing the corresponding bolts 3. Then, bolts 4 may be removed from connecting elements 46, 47 by manually rotating the bolts. Bolts 4 are brought into threaded engagement with connecting elements 48, 49 of the assembly 43, and the rod elements 50, 51 for the assembly 44 in FIG. 21 are fixed in position. Subsequent assembling work may be continued in a similar manner in order to construct the assembly 44. During such assembling and disassembling work, no excessively laborious force is required; and no unreasonable force will be exerted on the rod elements 45, 50, 51 or any other rod element. Hence, all work involved may be very efficiently performed.

Figure 22:
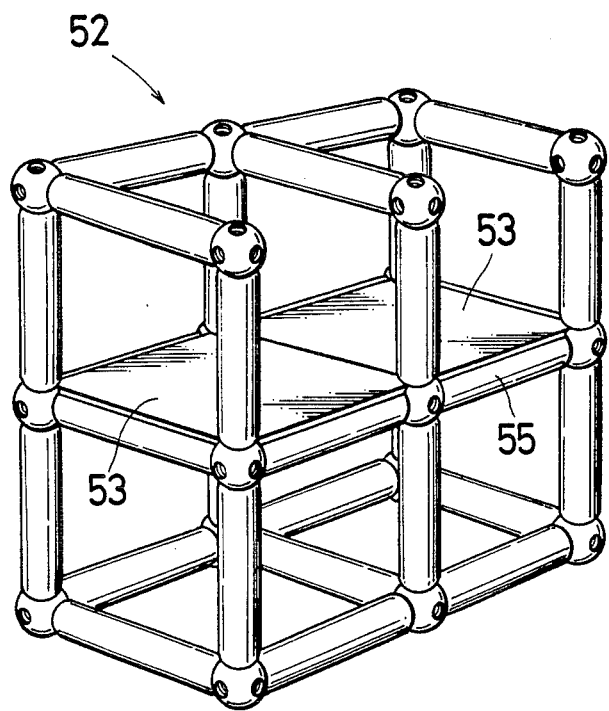
FIG. 22 is a perspective view showing a further form of an assembly according to the invention.
Figure 23:
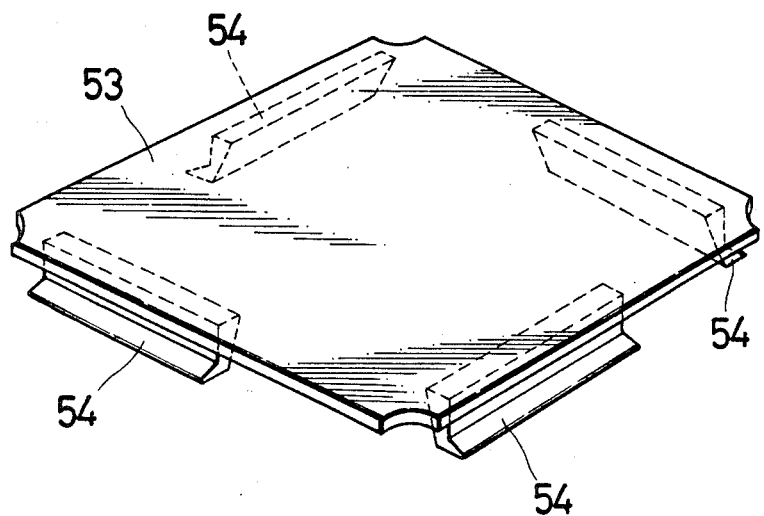
FIG. 23 is a perspective view of the plate elements shown in FIG. 22.
Figure 24:
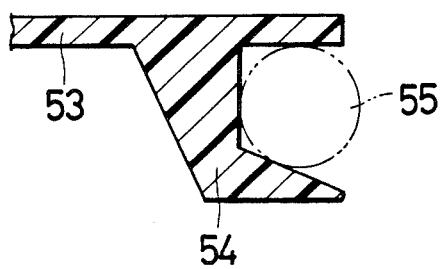
FIG. 24 is a section showing a plate element engaged with a rod element.

FIG. 22 is a perspective view showing another form of an assembly according to the invention. In this embodiment, plate elements 53 are used. As shown in FIG. 23, each plate element 53 has four depending support pieces 54, each of which engage a respective inner side periphery of a rod element 55 of the assembly, as shown in FIG. 24.

Rod elements 45, 50, 51, 55 have a configuration similar to that of aforesaid rod element 1, and connecting elements 46, 47, 48, 49 have a configuration similar to that of the connecting element 2.

In the earlier mentioned embodiment, the axis of the internal threads 8 formed in each connecting body 2 are either parallel or perpendicular to one another, but alternatively they may have other angles such as 35° and 45° to each other. It is also possible that connecting elements 2 having different angles between the axes of the internal threads can be differentiated from one another by their color. Such differentiation may enable younger children to easily construct an assembly in accordance with the invention. Further, differentiating connecting elements 2 in color from bolts 3 add to the beauty of the assembly kit. Differentiating each pair of half portions 1a constituting a rod element 1 in color from one to the other will also add to the beauty of the kit.

Figure 25:
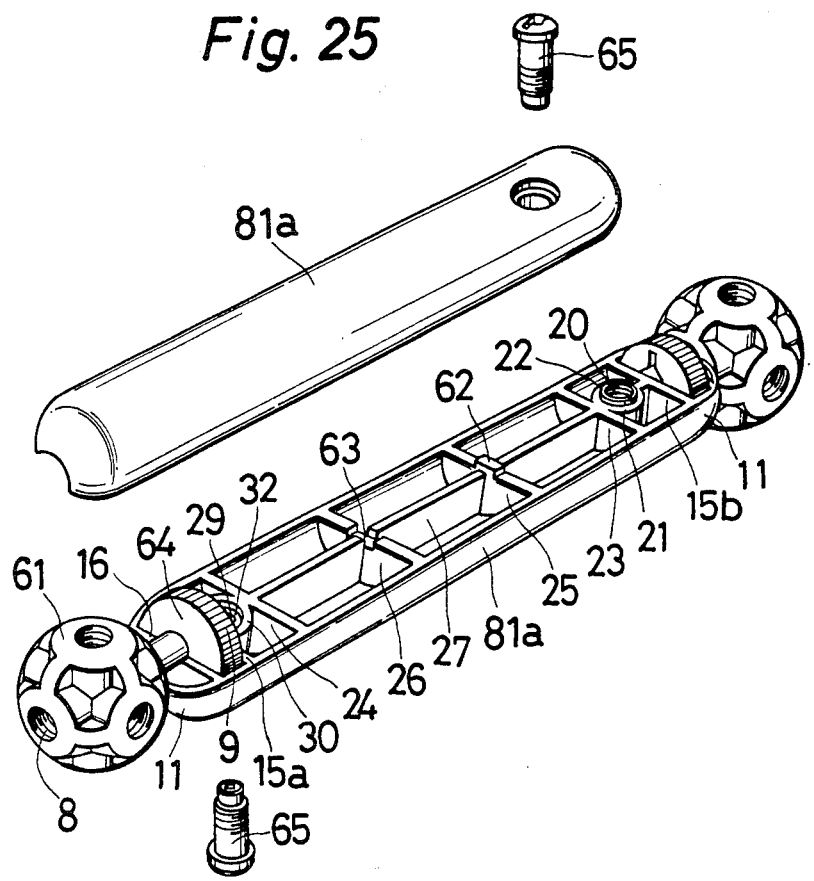
FIG. 25 is an exploded view in perspective showing another embodiment of the invention.
Figure 26:
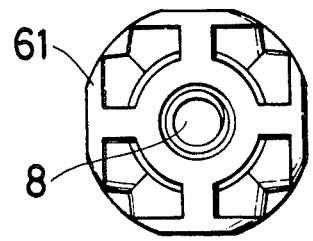
FIG. 26 is a plan view of a connecting element.
Figure 27:
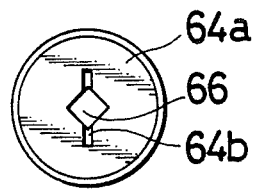
FIG. 27 is a plan view of a bolt.
Figure 28:
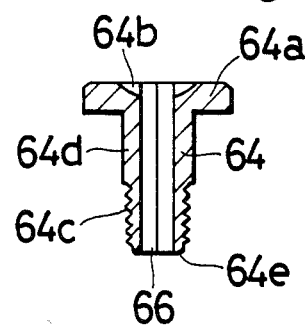
FIG. 28 is a longitudinal section of the bolt shown in FIG. 27.
Figure 29:
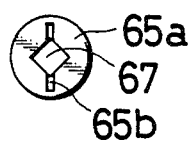
FIG. 29 is a plan view of a bolt.
Figure 30:
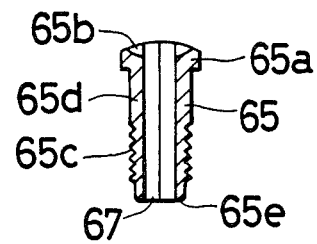
FIG. 30 is a longitudinal sectional view of the bolt shown in FIG. 29.

FIG. 25 is an exploded view in perspective showing another embodiment of the invention. FIG. 26 is a plan view of a connecting element 61. FIG. 27 is a plan view of a bolt 64. FIG. 28 is a longitudinal sectional view of the bolt 64 shown in FIG. 27. FIG. 29 is a plan view of a bolt 65. FIG. 30 is a longitudinal sectional view showing the bolt 65 shown in FIG. 29. This embodiment is similar to the earlier described embodiment, with comparable portions given identical reference numerals. In this embodiment, the connecting element 61 has a configuration more convenient for molding purposes than the connecting element 2 in the earlier mentioned embodiment. A protrusion 62 is formed on the top of the wall 25 of a half portion 81a, the protrusion extending perpendicularly to the axis of the half portion 81a and being generally of a rectangular parallelepiped configuration, its both ends in the longitudinal direction being chamfered. The top of the wall 26 has a recess 63 formed therein correspondingly to the protrusion 62. The protrusion 62 and the recess 63 are larger in size than the protrusion 31 and the recess 28 in the earlier embodiment. This ensures more accurate positioning and fitting in assembling a pair of half portions 81a.

Figure 31:
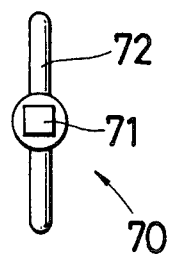
FIG. 31 is a front view of a clamping device.
Figure 32:
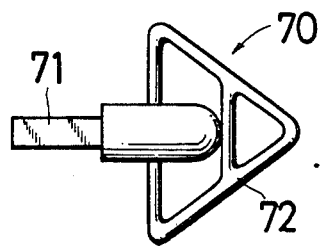
FIG. 32 is a side view of the clamping device shown in FIG. 31.
Figure 33:
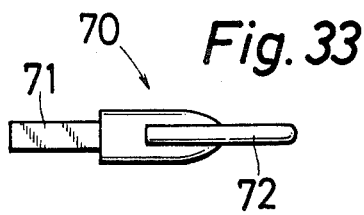
FIG. 33 is a plan view of the clamping device shown in FIG. 31.

Bolts 64, 65 have tool fitting holes 66, 67 respectively formed therein which extend therethrough in the axial direction thereof. The radial cross section of each of the fitting holes 66, 67 is square. A bolt turning device 70 shown in FIGS. 31 to 33 has a fitting portion 71 formed in a square rod shape, which fits in the fitting holes 66, 67. By holding and turning a handle portion 72 extending from the fitting portion 71, it is possible to tighten or loosen the bolts 64, 65 easily. Heads 64a, 65a of the bolts 64, 65 have depressions 64b, 65b formed therein as in the case of the bolt 3 in the earlier mentioned embodiment, so that the bolts 64, 65 may be readily turned by using a coin. Thus, working efficiency may be improved by suitably using the bolt turning device. The fitting holes 66, 67 extend through the entire axial length of the bolts 64, 65 from the heads 64a, 65a to the front ends 64e, 65e of shanks 64d, 65d having external threads 64c, 65c formed thereon, and this prevents the possibility of windpipe choking in the event of accidental swallowing by an infant and thus assures improved safety.

Figure 34:
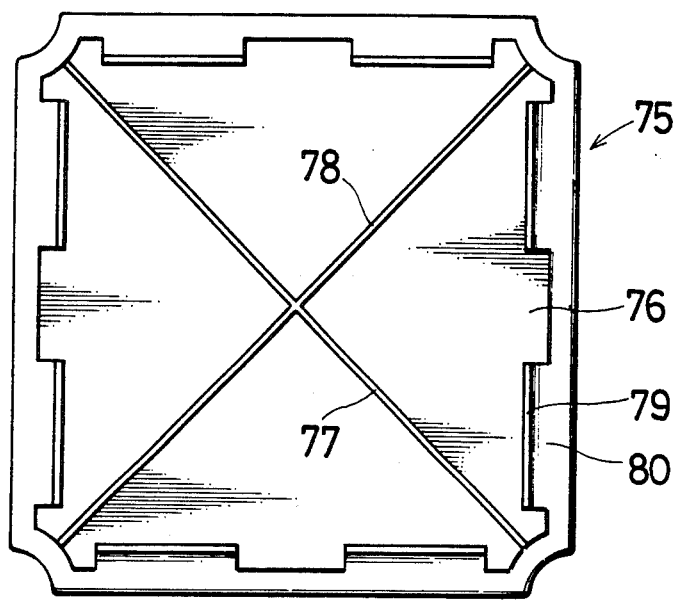
FIG. 34 is a bottom view of a plate element.
Figure 35:
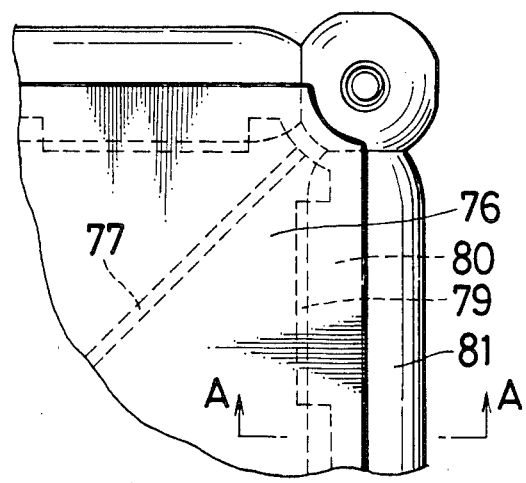
FIG. 35 is a plan view showing the plate element when fixed to a rod member.
Figure 36:
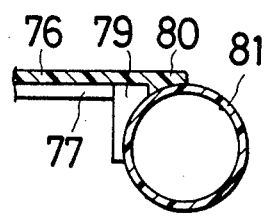
FIG. 36 is a section taken along the line A—A in FIG. 35.

FIG. 34 is a bottom view of a plate element 75. FIG. 35 is a plan view showing the plate element 75 as it appears when fixed to a rod member 81. FIG. 36 is a section taken along the line A—A in FIG. 35. Two diagonally extending and intersecting reinforcement ribs 77, 78 are formed on the back of a sheet portion 76 of the plate element 75. A peripheral edge portion 80 having support pieces 79 formed thereon is provided around outer periphery of the sheet portion 76. The plate element 75 formed in this way is more durable than the plate element 53 in the earlier embodiment, because it is reinforced, and is easy to remove. Support pieces 79 are formed in pairs on each side of the plate element 75, and therefore they are not prone to slippage in the event of an external force being exerted in a direction perpendicular to the thicknesswise direction of the plate member 75 (in the direction parallel to the sheet surface of FIG. 34).

Figure 37:
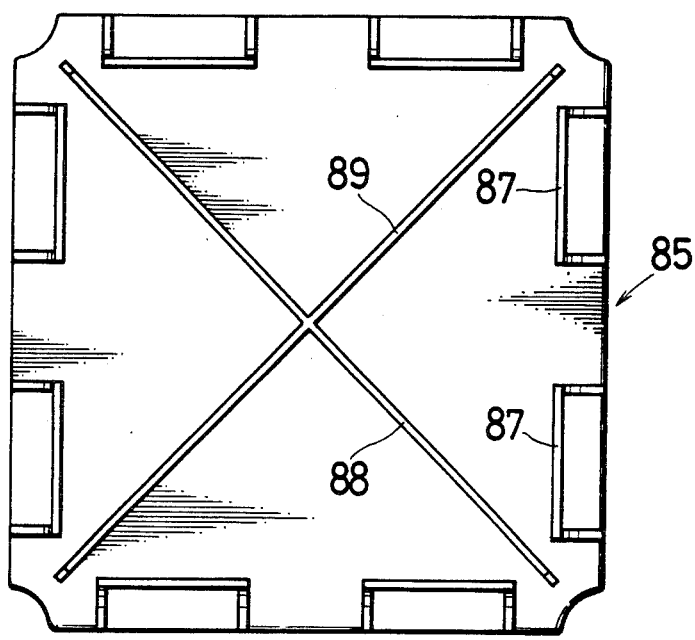
FIG. 37 is a bottom view of another form of a plate element corresponding to FIG. 34 in accordance with another embodiment of the invention.
Figure 38:
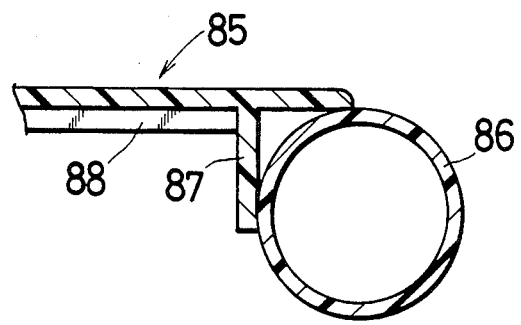
FIG. 38 is a section showing the plate element when fixed to a rod member.

FIG. 37 is a bottom view of another form of a plate element 85 corresponding to FIG. 34 in accordance with another embodiment of the invention and FIG. 38 is a section showing the plate element 85 when fixed to a rod member 86. Support pieces 87 are fixed to the rod element 86 in the condition shown in FIG. 38 by contacting the outer surface of the rod element 86. Rib plates 88, 89 extend diagonally to each other and are mounted on the sheet portion 85.

The assembly kit in accordance with the invention may be formed of synthetic resins.

Not only may the assembly kit according to the invention be used as a toy, but also it may be used in connection with building shelves or the like.

According to the invention, as above described, it is possible to accomplish a large variety of assembly configurations by using parts of identical construction, thereby minimizing the number of different parts involved. Further, according to the invention, not much labor is required in assembling and disassembling stops using the assembly kit of the invention, which naturally means improved working efficiency. Thus, the assembly kit according to the invention can be used very widely in common households.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An assembly kit for toy use or the like comprising:
a plurality of rod elements, each of which comprises a pair of identically shaped half portions extending in an axial direction and fasteners for fixing together the pair of half portions with an axially extending planar surface of one of the half portions abutting an axially extending planar surface of the other one of the half portions, each of the half portions having opposite ends in the axial direction and a first recessed portion and a second recessed portion inwardly of each of the ends, the first recessed portion being larger than the second recessed portion with the second recessed portion being located between the first recessed portion and a respective one of the ends of the half portion;
a plurality of bolts, each of the bolts having a head portion and a shank portion extending from one side of the head portion, the head portion being sized to fit into the first recessed portion and the shank portion having external threads at a free end thereof, the shank portion being sized to fit in the second recessed portion, the bolts being removable from each of the rod elements by removing the fasteners holding the pair of half portions together to thereby allow separation of the half portions in a direction perpendicular to the axial direction; and
a plurality of connecting elements, each of which includes a plurality of holes having internal threads in which the threaded shanks of the bolts are engaged.

2. An assembly kit as claimed in claim 1, wherein each half portion includes a first barrel portion and a second barrel portion, each of which extends in a radial direction perpendicular to the axial direction, the first barrel portion having a hole therein which extends in the radial direction completely through the half portion and the second barrel portion having a threaded hole therein extending in the radial direction part way through the half portion, the threaded hole extending inwardly from the axially extending planar surface of the half portion, whereby the pair of half portions are joined by two of the fasteners, each of which extends through the hole in the first barrel portion of one of the pair of half portions and is threadedly engaged with the threaded hole in the second barrel portion of the other one of the pair of half portions.

3. An assembly kit as claimed in claim 1, wherein a total of six holes having internal threads are formed in each of the connecting elements, each of the holes having an axis coincident with an axis of another one of the holes such that the holes are arranged as three pairs of holes with the axes of the three pairs of holes being perpendicular to each other.

4. The assembly kit as claimed in claim 2, wherein the second barrel portion includes an annular ledge extending therefrom in a direction outwardly from the planar surface of the half portion, the first barrel portion including a notch extending inwardly from the planar surface, the notch being sized to receive the annular ledge of another one of the half portions when the pair of half portions are joined to form one of the rod elements.

5. The assembly kit as claimed in claim 1, wherein each of the half portions includes a protrusion extending outwardly from the planar surface thereof and a recess extending inwardly from the planar surface thereof, the recess being sized to receive the protrusion of another one of the half portions when the pair of half portions are joined to form one of the rod elements.

6. The assembly kit as claimed in claim 2, wherein the second barrel portion includes an annular ledge extending therefrom in a direction outwardly from the planar surface of the half portion, the first barrel portion including a notch extending inwardly from the planar surface, the notch being sized to receive the annular ledge of another one of the half portions when the pair of half portions are joined to form one of the rod elements and each of the half portions includes a protrusion extending outwardly from the planar surface thereof and a recess extending inwardly from the planar surface thereof, the recess being sized to receive the protrusion of another one of the half portions when the pair of half portions are joined to form one of the rod elements.

7. The assembly kit as claimed in claim 1, wherein each of the fasteners comprises a bolt having a head and a shank extending from one side of the head, the head including a depression in an opposite side thereof, the depression being sized for engagement with a coin whereby the bolt can be turned by inserting a coin in the depression and rotating the coin.

8. The assembly kit as claimed in claim 1, wherein each of the fasteners comprises a bolt having a head and a shank extending from one side of the head, the head including an axially extending tool fitting hole in an opposite side thereof, the tool fitting hole having a configuration for receiving a bolt turning tool therein whereby the bolt can be turned by inserting the bolt turning tool therein and rotating the bolt turning tool.

9. The assembly kit as claimed in claim 8, wherein the tool fitting hole has a square configuration.

10. The assembly kit as claimed in claim 9, wherein the tool fitting hole extends completely through the head and shank of the bolt.

11. The assembly kit as claimed in claim 6, wherein each of the fasteners comprises a bolt having a head and a shank extending from one side of the head, the head including a depression in an opposite side thereof, the depression being sized for engagement with a coin whereby the bolt can be turned by inserting a coin in the depression and rotating the coin.

12. The assembly kit as claimed in claim 6, wherein each of the fasteners comprises a bolt having a head and a shank extending from one side of the head, the head including an axially extending tool fitting hole in an opposite side thereof, the tool fitting hole having a configuration for receiving a bolt turning tool therein whereby the bolt can be turned by inserting the bolt turning tool therein and rotating the bolt turning tool.

13. The assembly kit as claimed in claim 12, wherein the tool fitting hole has a square configuration.

14. The assembly kit as claimed in claim 12, wherein the tool fitting hole extends completely through the head and shank of the bolt.

15. The assembly kit as claimed in claim 1, wherein the head portion of each of the bolts includes a depression in an opposite side thereof, the depression being sized for engagement with a coin whereby the bolt can be turned by inserting a coin in the depression and rotating the coin.

16. The assembly kit as claimed in claim 1, wherein the head portion of each of the bolts includes an axially extending tool fitting hole in an opposite side thereof, the tool fitting hole having a configuration for receiving a bolt turning tool therein whereby the bolt can be turned by inserting the bolt turning tool therein and rotating the bolt turning tool.

17. The assembly kit as claimed in claim 16, wherein the tool fitting hole has a square configuration.

18. The assembly kit as claimed in claim 16, wherein the tool fitting hole extends completely through the head portion and shank of the bolt.

19. The assembly kit as claimed in claim 6, wherein the head portion of each of the bolts includes a depression in an opposite side thereof, the depression being sized for engagement with a coin whereby the bolt can be turned by inserting a coin in the depression and rotating the coin.

20. The assembly kit as claimed in claim 6, wherein the head portion of each of the bolts includes an axially extending tool fitting hole in an opposite side thereof, the tool fitting hole having a configuration for receiving a bolt turning tool therein whereby the bolt can be turned by inserting the bolt turning tool therein and rotating the bolt turning tool, the tool fitting hole extending completely through the head portion and shank of the bolt.

* * * * *